UNITED STATES PATENT OFFICE.

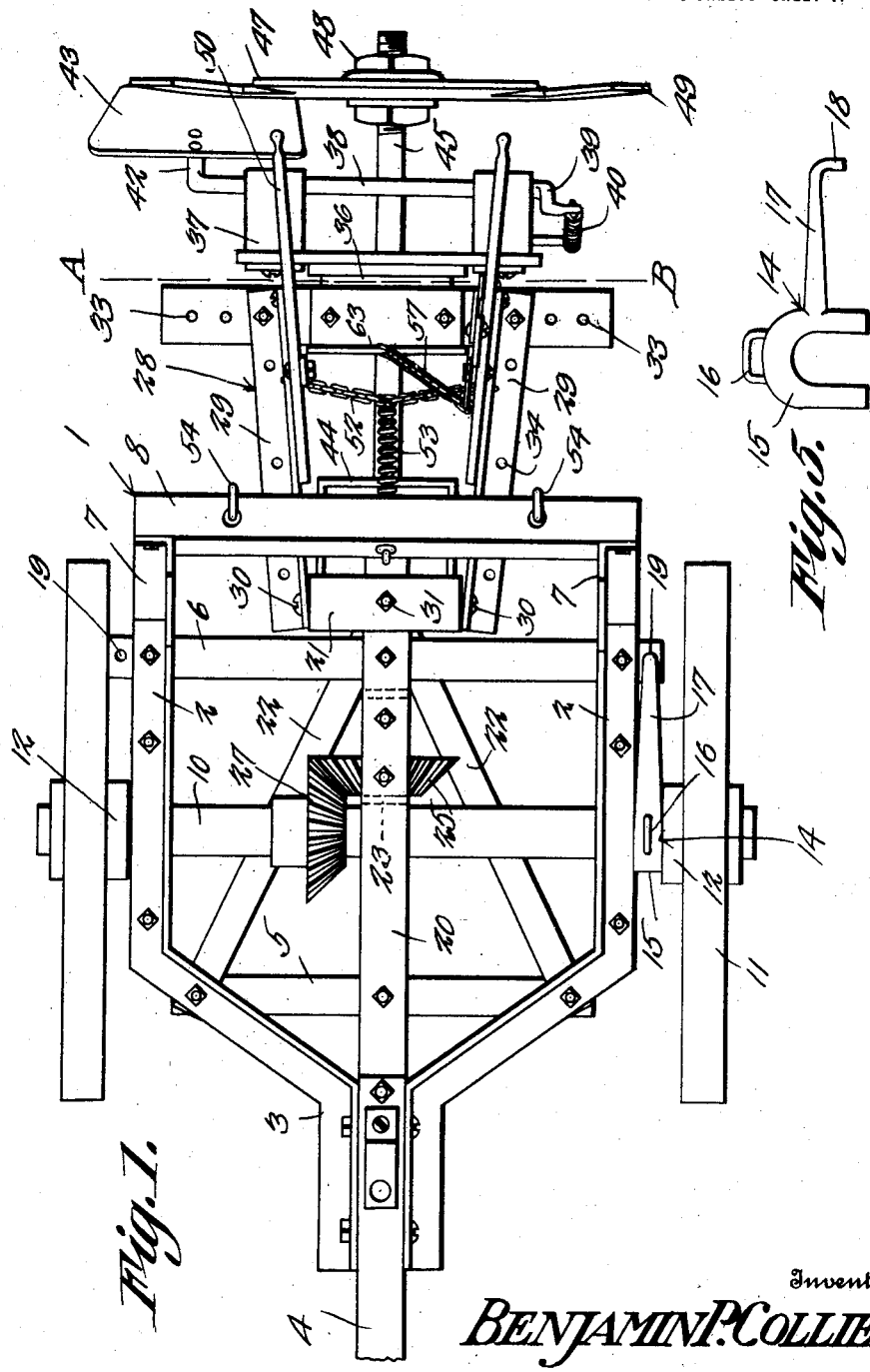

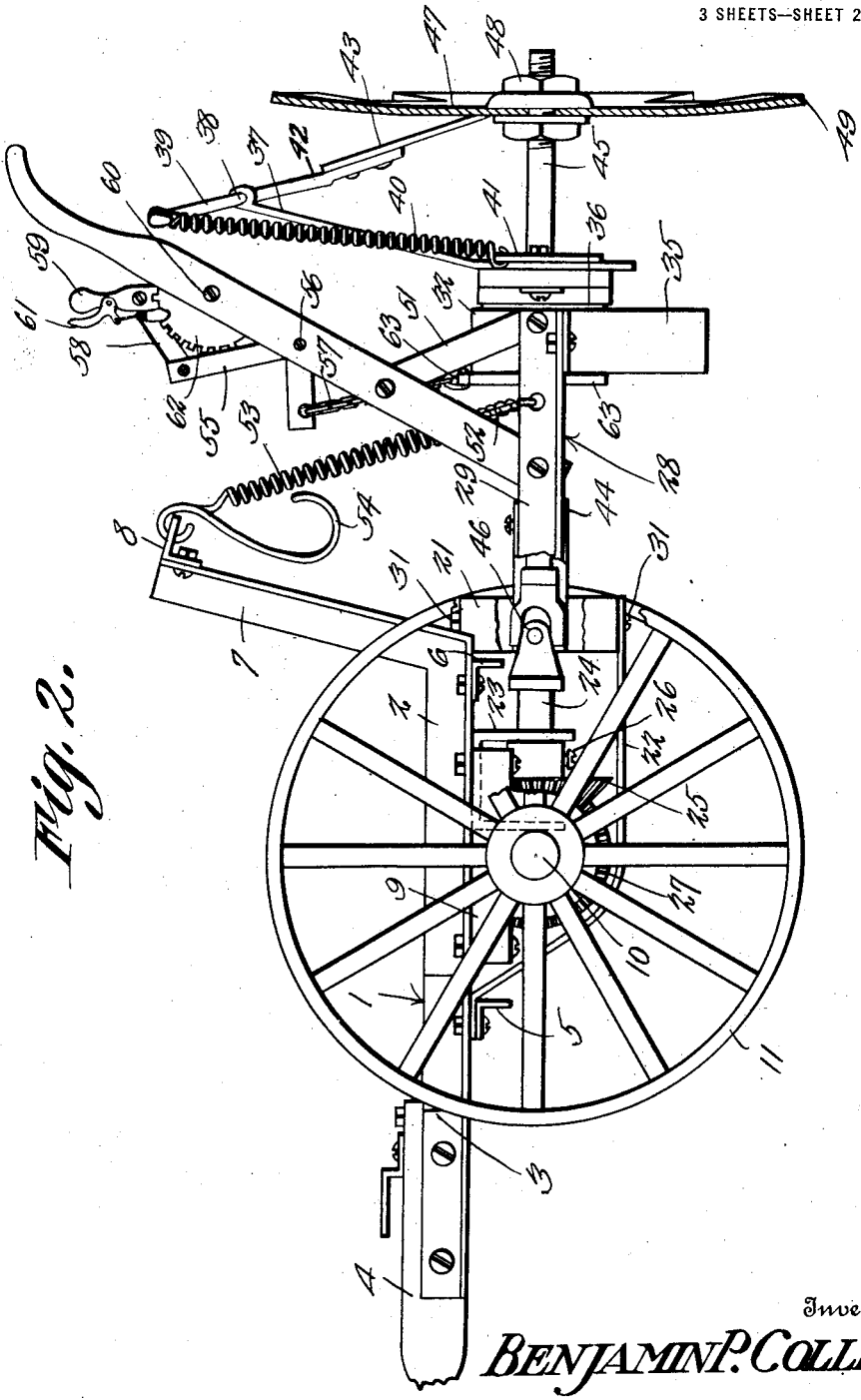

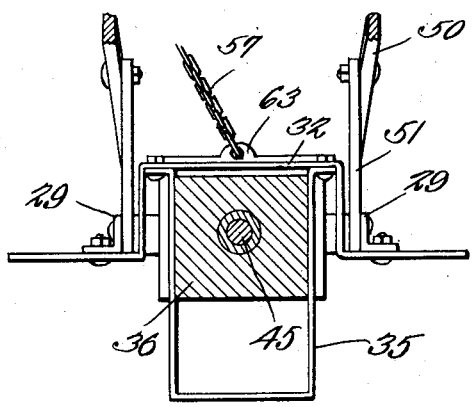
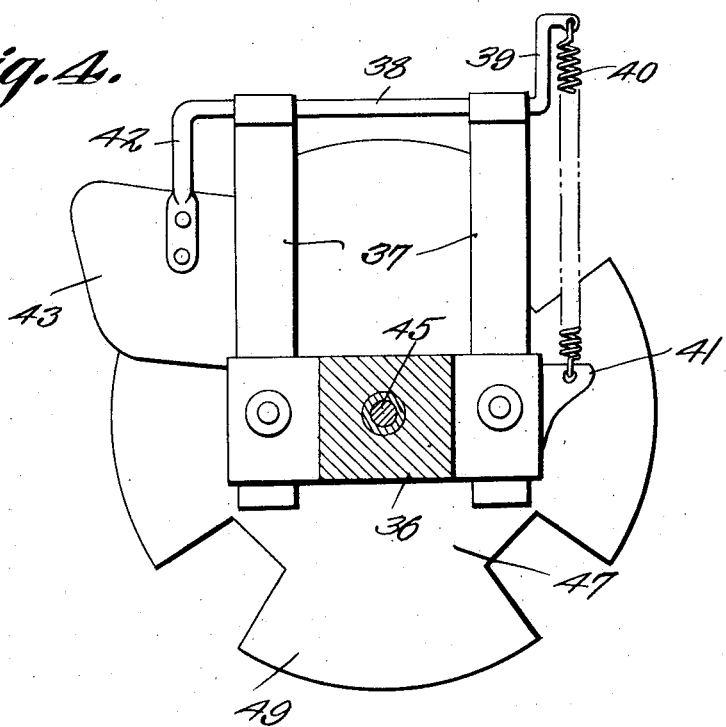

BENJAMIN P. COLLIER, OF ALBANY, ALABAMA.

COTTON-CHOPPER.

1,391,246.  Specification of Letters Patent.  Patented Sept. 20, 1921.

Application filed October 13, 1920. Serial No. 416,633.

*To all whom it may concern:*

Be it known that I, BENJAMIN P. COLLIER, a citizen of the United States, residing at Albany, in the county of Morgan and State of Alabama, have invented a new and useful Cotton-Chopper, of which the following is a specification.

The device forming the subject matter of this application is adapted to be employed for cultivating cotton, millet and other crops and one object of the invention is to provide an agricultural machine of the sort above mentioned which will slide and scrape the ground smoothly, the operation being such that the cotton or other crop will not be burst out of the ground.

The invention aims to provide a machine of the sort above mentioned which will operate with a minimum expenditure of effort for draft.

The invention aims to provide novel means whereby the soil at each side of the machine may be cultivated, at the same time that the soil in the wake of the machine is being operated on by the rotary hoe.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Fig. 2 is a side elevation; Figs. 3 and 4 are cross sections on the line A—B of Fig.1, looking in opposite directions; and Fig. 5 is a side elevation of the shim.

The device forming the subject matter of this application includes a main frame 1 which may be built in various ways without jeopardizing the utility of the machine. The main frame 1 may include side bars 2 converging to form hounds 3, between which a tongue 4 is secured. The hounds 3 are connected by a front cross bar 5, the side bars 2 being united by an intermediate cross bar 6. The rear ends of the side bars 2 are upwardly extended, as indicated at 7, and are united by a rear cross bar 8. Bearings 9 are secured to the side bars 2, and in the bearings, an axle 10 is journaled for rotation and mounted for slight endwise movement. Ground wheels 11 are connected to the ends of the axle 10 by ratchet hubs 12. The ratchet hubs 12 have not been described in detail, because any ratchet hub adapted for the purpose may be employed, and because I am aware of the fact that a specific form of ratchet hub cannot be protected in the same application with an agricultural machine. The numeral 14 designates, generally a shim including a U-shaped head 15 having a handle 16, and a shank 17 projecting rearwardly from the head, the shank terminating in a dependent finger 18. The axle 10 may be moved endwise in the bearings 9, the head 15 of the shim being straddled on either end of the axle, between one hub 12 and the corresponding side bar 2, to hold the axle slid either to the left or to the right. When the head 15 of the shim 14 is straddled on the axle 10, the finger 18 is received in a hole 19 formed in the outer end of the cross bar 6, there being a hole in each end of the cross bar, to accommodate the finger 18, when the shim 14 is shifted to one side of the machine to the other. The function of the shim 14 will be made manifest hereinafter. A bar 20 extends longitudinally of the main frame 1, the bar being secured to the tongue 4, to the cross bar 5 and to the cross bar 6, the bar 20 extending to the rear of the bar 6 and being connected to the top of a loop-shaped bracket 21. Braces 22 are connected at their rear ends to the bottom portion of the bracket 21, the braces diverging and extending upwardly, the forward ends of the braces being connected to the hounds 3 at the points where the bar 5 is united to the hounds. A bearing yoke 23, of inverted U-shape, is secured to the bar 20. In the yoke 23, a shaft 24 is journaled, a beveled pinion 25 being secured to the shaft 24, within the contour of the yoke. The yoke 23, coöperating with a pinion 25 holds the shaft 24 against longitudinal movement. The numeral 26 denotes any suitable means for securing the pinion 25 to the shaft 24. The pinion 25 meshes into a beveled pinion 27, secured in any suitable way to the axle 10. The axle 10 may be shifted endwise, to move the pinion 27 into and out of mesh with the pinion 25. If the shim 14 is inserted between one hub 12 and the corresponding side bar 2, then the pinions 27 and 25 will be held in mesh, whereas, if the shim 24 is inserted between the other hub 12 and the adjacent side bar 2, then the pinions 27 and 25 will be held out of mesh. In view of the foregoing, it will be obvious that the operator has within his command, a means whereby, at will, rotation may be imparted to the shaft 24 from the axle 10 and the ground wheels 11, it being possible, upon occasion, to disconnect the pinions 25 and 27, so that the axle 10 may rotate without imparting rotation to the shaft 24.

The device includes an auxiliary frame 28 made up of side members 29 united by pivot elements 30 to the loop-shaped bracket 21. At this point it may be observed that the elements 31 which connect the loop-shaped bracket 21 with the bar 20 and with the rear ends of the braces 22 are pivot elements, the construction being such that the bracket 21 may swing on a vertical axis, the side members 29 of the auxiliary frame being connected at 30 to the bracket 21, to swing upwardly and downwardly. The auxiliary frame 28 has, therefore, practically, a universal movement, which enables the hoe (hereinafter described) to conform to the surface of the soil. The rear ends of the side members 29 of the auxiliary frame 28 are connected by an arched cross bar 32. The ends of the cross bar 32 project beyond the side members 29 and are supplied with openings 33, the openings 34 being adapted to receive connections (not shown) whereby side drags may be assembled with the machine, and the openings 33 permitting the rear ends of the side members 29 to be spread apart so as to separate the side drags and to permit the drags from working too close to the standing plants. A depending U-shaped guide 35 is connected to the intermediate portion of the cross bar 32. A bearing 36 is mounted for limited vertical reciprocation in the guide 35 and carries upwardly projecting standards 37 wherein a transverse rock shaft 38 is journaled, the rock shaft being provided at one end with an upstanding arm 39, one end of a tension spring 40 being connected to the arm, and the other end of the spring being connected to an ear 41 carried by one of the standards 37. The opposite end of the shaft 38 is supplied with a depending arm 42 carrying a scraper 43.

A U-shaped bearing 44 is mounted to swing vertically on the pivot elements 30. A shaft 45 is journaled in the bearing 44 and in the bearing 36. A universal joint 46 connects the shaft 45 with the shaft 24. A rotary hoe 47 is secured at 48 to the rear end of the shaft 45 and is provided with peripheral fingers 49, spaced apart, circumferentially of the hoe, as occasion may demand.

Rearwardly extended handles 50 are secured to the side members 29 of the auxiliary frame 28 and are sustained by braces 51. The side members 29 of the auxiliary frame 28 are united by a connection 52 to which is united the lower end of a retractile spring 53, the upper end of which is united to the cross bar 8. The spring 53 serves to support the auxiliary frame 28 and the hoe 47 yieldingly. Hooks 54 are mounted on the cross bar 8. If desired, when the machine is not in use, the auxiliary frame 28 may be swung upwardly on the pivot elements 30, the handles 50 of some other parts of the auxiliary frame being engaged with the hooks 54. In this way, the hoe 47 may be held out of engagement with the ground, during transportation. The numeral 55 denotes a bell crank lever fulcrumed at 56 on one of the handles 50, the numeral 57 denoting a chain connected to the lever 55. The lever 55 is connected by a link 58 to a hand lever 59 fulcrumed at 60 on one of the handles 50 and provided with a latch mechanism 61 adapted to engage a segment 62 carried by the said machine. The chain 57 may be engaged with a flange 63 on the forward end of the bearing 36 to secure a vertical adjustment of the bearing, as hereinafter described.

In practical operation, the axle 10 may be moved endwise, to dispose the beveled pinion 27 in mesh with the beveled pinion 25, or out of mesh with the said beveled pinion. It is possible, therefore, to impart rotation to the shaft 24, from the axle 10, or not to impart rotation to the said shaft, as the operator may desire. The shim 14 may be inserted between either of the side bars 2 and the corresponding hub 12, to hold the pinions 25 in mesh or out of mesh with each other. From the beveled pinion 25 rotation is imparted to the shaft 24, motion being transmitted by the universal joint 46 to the shaft 45 and to the rotary hoe 47. The hoe 47 rotates in an approximately vertical plane and cuts and breaks up the soil about the standing plants, some of the plants passing between the fingers 49 of the hoe, and superfluous plants being cut out by the fingers of the hoe.

The auxiliary frame 28 has, practically, a universal movement with respect to the main frame 1, owing to the fact that the members 29 of the auxiliary frame are pivoted at 30 to the bracket 21 for vertical swinging movement, and since the bracket 21 is pivoted, at 31, to the parts 20 and 22, for lateral swinging movement on a vertical axis. This construction permits the hoe 47 to move as occasion may require, a vertical adjustment of the shaft 45 and the hoe 47 being effected by raising or lowering the bearing 36, through the instrumentality of the hand lever 59, the link 58, the bell crank lever 56 and the chain 57. As hereinbefore explained, the spring 53 supports the auxiliary frame 28 and the hoe 47 yieldingly, it being possible to swing the auxiliary frame upwardly and forwardly, and to engage the auxiliary frame with the hooks 54, when it is desired to transport the implement from place to place.

Having thus described the invention, what is claimed is:—

1. In a device of the class described, a main frame; a ground wheel journaled thereon; a loop-shaped bracket; a pivot element uniting the bracket with the main frame for swinging movement on a vertical axis; an auxiliary frame including side members and a bearing carried thereby; a pivot element uniting the side members with the bracket to permit a vertical swinging movement of the auxiliary frame with respect to the bracket; a shaft including parts, one of said parts being journaled on the main frame, and the other of said parts being journaled in the bearing; a universal joint connecting said parts of the shaft and located within the bracket; an operative connection between the first specified one of said parts of the shaft and the ground wheel; and a rotary hoe carried by the other of said parts of the shaft.

2. In a device of the class described, a main frame; an axle mounted to rotate in the main frame and movable transversely of the frame; wheels on the axle; a shaft journaled in the frame; a rotary hoe; means for connecting the rotary hoe operatively with the shaft; coöperating beveled pinions on the shaft and on the axle; and a shim insertible between the frame and either wheel, to hold the beveled pinions in mesh and out of mesh.

3. In a device of the class described, a main frame; a ground wheel thereon; an auxiliary frame connected to the main frame for swinging movement; a forward shaft journaled in the main frame; means for connecting the forward shaft with the ground wheel; a bearing adjustable vertically in the auxiliary frame; means for adjusting the bearing vertically; a rear shaft journaled in the bearing; a universal joint connecting the shafts; and a rotary hoe carried by the rear shaft.

4. In a device of the class described, a main frame; a ground wheel carried thereby; an auxiliary frame connected with the main frame for swinging movement; a bearing mounted in the auxiliary frame for vertical sliding movement; means carried by the auxiliary frame and under the control of an operator for sliding the bearing vertically; a flexible shaft structure comprising parts journaled in the main frame and in the bearing; means for connecting one end of the shaft structure with the ground wheel; and a rotary hoe on the other end of the said shaft structure.

5. In a device of the class described, a main frame having an upstanding rear end; a ground wheel mounted on the main frame; an auxiliary frame connected with the main frame for vertical swinging movement; a flexible shaft structure journaled on the main and auxiliary frames; means for connecting said shaft structure with the ground wheel; a rotary hoe carried by said shaft structure and movable with the auxiliary frame; spring means for supporting the auxiliary frame yieldingly from the upstanding rear end of the main frame; and means for connecting the auxiliary frame to the upstanding rear end of the main frame when the auxiliary frame is swung upwardly and forwardly.

In testimony that I claim the foregoing as my own, I have hereto affixed my signature in the presence of two witnesses.

BENJAMIN P. COLLIER.

Witnesses:
J. A. THORNHILL,
F. L. CHENAULT.